United States Patent
Grady et al.

[11] Patent Number: 6,130,756
[45] Date of Patent: Oct. 10, 2000

[54] METHOD FOR CHARACTERIZING A RESPONSE FUNCTION OF AN OUTPUT

[76] Inventors: Barbara L. Grady; Kevin E. Spaulding, both of Eastman Kodak Company, 343 State St., Rochester, N.Y. 14650

[21] Appl. No.: 09/041,206

[22] Filed: Mar. 12, 1998

[51] Int. Cl.$^7$ .................................................. G03F 3/08
[52] U.S. Cl. ........................... 358/1.1; 358/1.9; 358/523
[58] Field of Search ............................. 358/504, 523, 358/406, 296, 1.1, 1.2, 1.6, 1.9, 1.17, 1.16, 501, 518, 527

[56] References Cited

U.S. PATENT DOCUMENTS

| | | | |
|---|---|---|---|
| 4,955,680 | 9/1990 | Froese-Peeck et al. | 315/382 |
| 5,319,459 | 6/1994 | Mochizuki et al. | 348/189 |
| 5,323,231 | 6/1994 | Hassler et al. | 348/185 |
| 5,459,678 | 10/1995 | Feasey | 364/571.07 |
| 5,477,264 | 12/1995 | Sarbadhikari et al. | 348/231 |
| 5,561,459 | 10/1996 | Stokes et al. | 348/180 |
| 5,565,897 | 10/1996 | Kikinis et al. | 345/213 |
| 5,606,365 | 2/1997 | Maurinus et al. | 348/222 |
| 5,638,117 | 6/1997 | Engeldrum et al. | 348/179 |
| 5,646,752 | 7/1997 | Kohler et al. | 358/520 |
| 5,650,942 | 7/1997 | Granger | 364/526 |
| 5,760,913 | 6/1998 | Falk | 358/523 |
| 5,774,230 | 6/1998 | Goto | 358/523 |
| 5,809,213 | 10/1999 | Bhattacharjya | 358/1.6 |
| 5,818,960 | 10/1998 | Gregory, Jr. et al. | 358/523 |
| 5,883,985 | 3/1999 | Pourjavid | 358/523 |
| 5,973,801 | 10/1999 | Bresler | 358/520 |
| 6,008,907 | 12/1999 | Vigneau et al. | 358/1.9 |

*Primary Examiner*—Madeleine Nguyen

[57] ABSTRACT

A method for characterizing a response function of an output device, the method comprises the steps of producing a test image on the output device with a set of one or more test patches having known code values; obtaining one or more captured images of the test image using a digital camera; determining colorimetric values for each of the test patches in the captured images using a known response function of the digital camera; and determining a response function of the output device which relates the known code values to the determined colorimetric values.

63 Claims, 4 Drawing Sheets

METHOD FOR CHARACTERIZING A RESPONSE FUNCTION OF AN OUTPUT

FIELD OF THE INVENTION

The invention relates generally to the field of output devices such as printers and video displays and, more particularly, to a method for characterizing the output devices by using a digital camera.

BACKGROUND OF THE RELATED ART

A computer system typically includes a base unit containing the primary electronics for performing processing functions, a video display for displaying text, graphics and images thereon, and a printer for printing hardcopies. Over time, the printer and video display, hereinafter collectively referred to as output devices, drift from their original state, or may be in an unknown state. Therefore, it is desirable to characterize the printer and video display for determining their current state so that calibration of the output device or modification of subsequent incoming data can be performed.

Presently, for characterization of output devices, a known input is sent to the output device, and specialized and costly equipment (such as a spectrophotometer, colorimeter, densitometer, or spectroradiometer) is used for measuring the hardcopy or softcopy output of the device produced from this input. Given this information, output devices can be calibrated to a known aim response using standard techniques or subsequent incoming data can be modified according to the derived characterization.

Although the presently known and utilized systems and methods are satisfactory, they are not without drawbacks. The specialized testing equipment is costly and its primary purpose is only for this testing, which makes it even less cost efficient.

SUMMARY OF THE INVENTION

The present invention is directed to overcoming one or more of the problems set forth above. Briefly summarized, according to one aspect of the present invention, the invention resides in a method for characterizing a response function of an output device, the method comprising the steps of: (a) producing a test image on the output device with a set of one or more test patches having known code values; (b) obtaining one or more captured images of the test image using a digital camera; (c) determining colorimetric values for each of the test patches in the captured images using a known response function of the digital camera; (d) determining a response function of the output device which relates the known code values to the determined colorimetric values.

The above and other objects of the present invention will become more apparent when taken in conjunction with the following description and drawings wherein identical reference numerals have been used, where possible, to designate identical elements that are common to the figures.

ADVANTAGEOUS EFFECT OF THE INVENTION

The present invention has the advantage of not requiring costly equipment to measure output device response. Additionally, it has the advantage that the equipment which is used can be utilized for other purposes, and may be a device that the user already owns.

DETAILED DESCRIPTION OF THE INVENTION

In the following description, the present invention will be described in the preferred embodiment as a software program. Those skilled in the art will readily recognize that the equivalent of such software may also be constructed in hardware.

Figure 1:
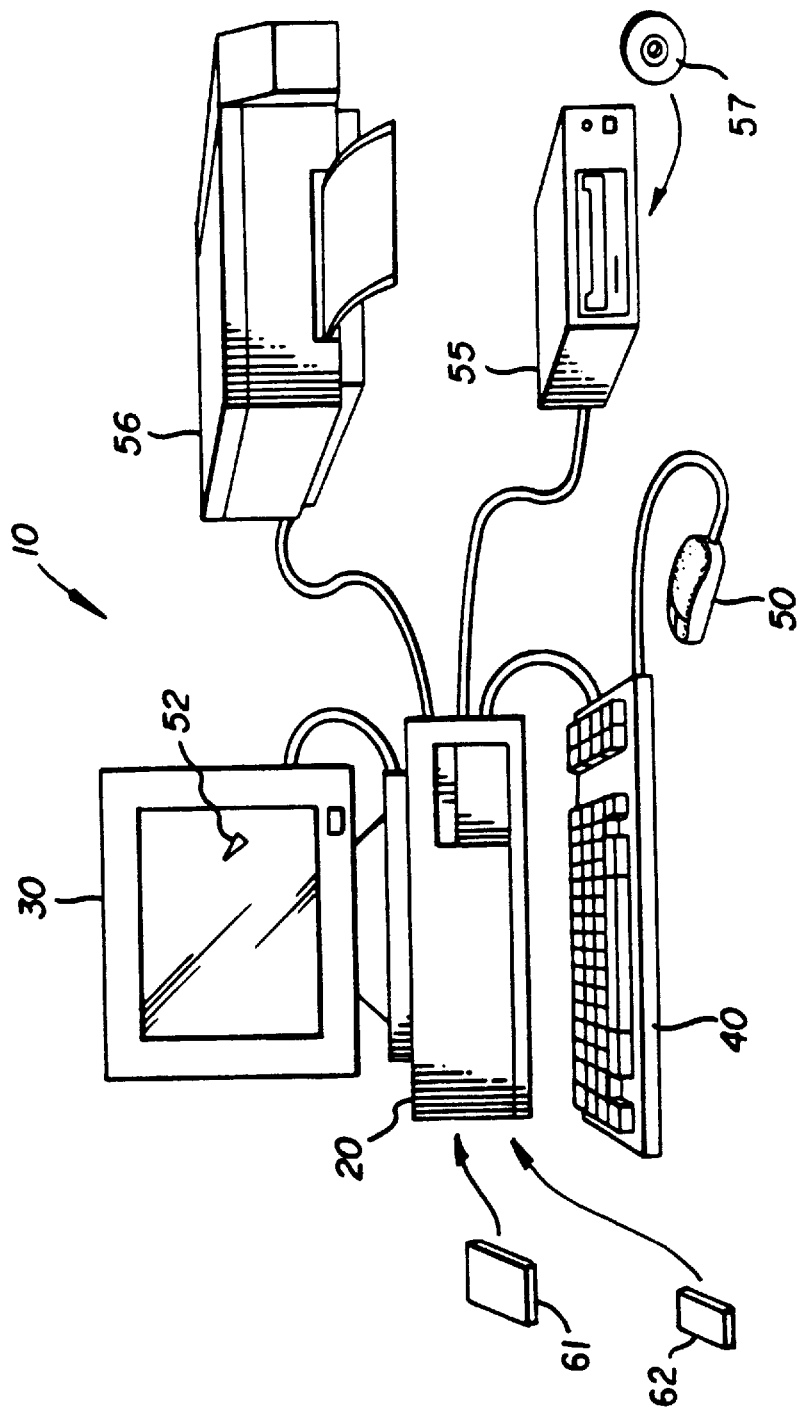
FIG. 1 is a perspective view of a computer system for implementing the present invention.

Referring to FIG. 1, there is illustrated a computer system 10 for implementing the present invention. Although the computer system 10 is shown for the purpose of illustrating a preferred embodiment, the present invention is not limited to the computer system 10 shown, but may be used on any electronic processing system. The computer system includes a microprocessor based unit 20 for receiving and processing software programs and for performing other processing functions. A video display 30 is electrically connected to the microprocessor based unit 20 for displaying user related information associated with the software and displaying or previewing images. A keyboard 40 is also connected to the microprocessor based unit 20 for permitting a user to input information to the software. As an alternative to using the keyboard 40 for input, a mouse 50 may be used for moving a selector 52 on the video display 30 and for selecting an item on which the selector 52 overlays, as is well known in the art.

A compact disk-read only memory (CD-ROM) 55 is connected to the microprocessor based unit 20 for receiving software programs and for providing a means of inputting the software programs and other information to the microprocessor based unit 20 via a compact disk 57, which typically includes a software program. In addition, a floppy disk 61 may also include a software program, and is inserted into the microprocessor based unit 20 for inputting the software program. Still further, the microprocessor based unit 20 may be programmed, as is well know in the art, for storing the software program internally. A printer 56 is connected to the microprocessor based unit 20 for printing a hardcopy of the output of the computer system 10.

Captured images may be input into the microprocessor based unit 20 via a personal computer card (PC card) 62 or, as it was formerly known, a personal computer memory card international association card (PCMCIA card) which contains digitized images electronically embodied in the card 62. Alternatively, the captured images may be input into the microprocessor based unit 20 using other means such as a serial interface, or an infrared communications link. Before proceeding further, it is first instructive to have a basic understanding of the process by which digitized images are typically formed with a digital camera.

Figure 2:
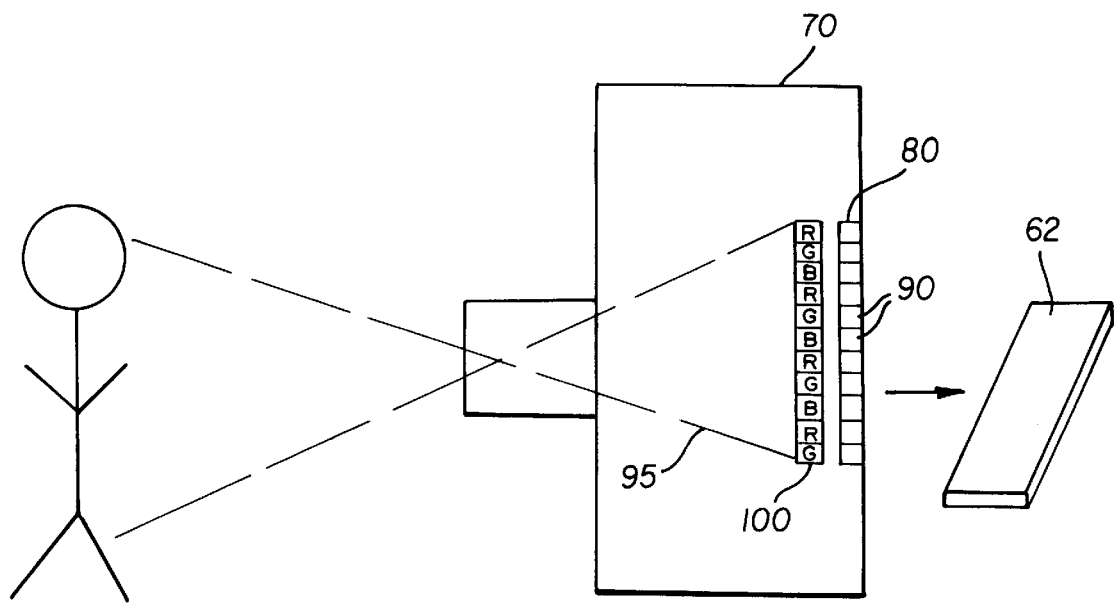
FIG. 2 is a side view of a digital camera for capturing an image.

In this regard, and referring to FIG. 2, a camera 70 includes an image sensor, such as a charge-coupled device (CCD), 80 having a plurality of pixels 90 for capturing the optical incident image 95. Any color filter array 100, such as a Bayer array, is placed over the image sensor 80 for permitting a color representation of the image 95 (colored filter array image or CFA image) to be captured by the pixels 90, as is well known in the art. The pixels 90 convert the incident optical energy into a plurality of values, typically ranging from 0–255. The image 95 is then stored electronically on the PC card 62, or other storage media such as, RAM or a magnetic disk, for permitting later retrieval by well known computer devices. In some cases, the microprocessor based unit 20 used to perform the processing functions may be provided internally to the digital camera 70, so that the method of the present invention can be performed on either a host computer or in the digital camera 70. Alternatively, the processing functions may be provided internally to the output device being characterized.

Figure 3:
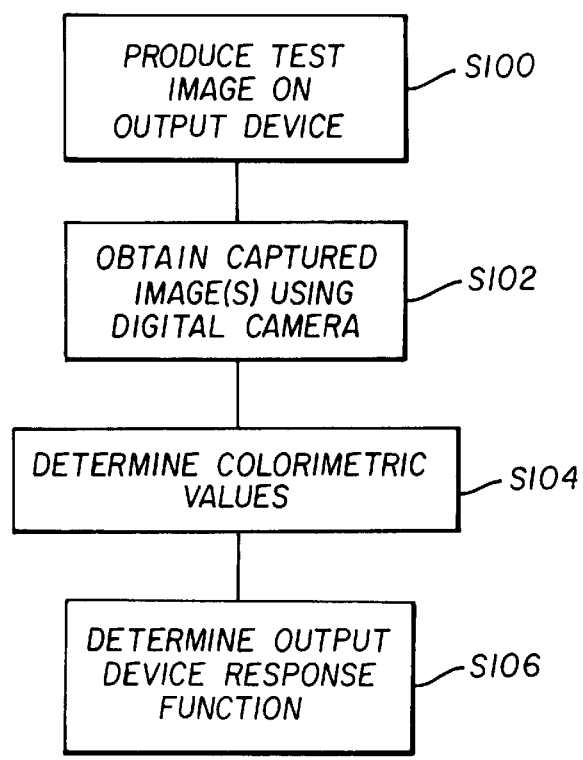
FIG. 3 is a flowchart showing an overview of the present invention.

Referring to FIG. 3, there is illustrated a flowchart showing an overview of the present invention that can be used to determine a response function for the output device. First, a test image is produced on the output device with one or more test patches having known code values (S100). Next, one or more captured images of the test image are obtained using a digital camera (S102). Colorimetric values for each of the test patches are then determined using a known response function of the digital camera (S104). Finally, the colorimetric values are used to determine the response function of the output device (S106).

Each of the steps shown in FIG. 3 will now be described in more detail. The first step is to produce a test image on the output device (S100). The output device will generally be a video display, or a printer, but the method can be applied to any other type of output device capable of displaying or producing an image. The test image is comprised of a set of one or more test patches having known device code values. Generally, the test patches may include a series of neutral patches of different gray values, as well as a series of colored patches. The test patches which are included in the test image will generally be chosen according to the type of device that is being characterized. Devices, such as video displays, having relatively simple response functions will generally require fewer test patches than devices having more complex responses, such as printers. The arrangement of the test patches may be an important consideration in order to avoid introducing biases into the determined response function due to non-uniformities in the output device, or in the response function of the digital camera. For example, in some cases, it will be desirable to randomize the order of the patches, or to group the most critical patches in the center of the image.

The next step is to obtain one or more captured images of the test image using a digital camera (S102). This may involve having the computer instruct the user to capture images of the test image and subsequently input them to the computer. Alternatively, the digital camera may be controlled by the computer, so that the computer can initiate the capturing of the images. To reduce the effects of image noise, it may be desirable to capture multiple images which can be used to produce averaged results. In some cases, all of the test patches may not fit into a single test image. In this case, it may be necessary to capture a series of images each of which contains only a portion of the test patches. The data from these images can then be combined to obtain a complete set of test patches. As mentioned before, the image(s) captured by the digital camera can be input into the microprocessor based unit 20, using many different methods such as a PC card, a serial interface, or an infrared communication link.

Figure 4:
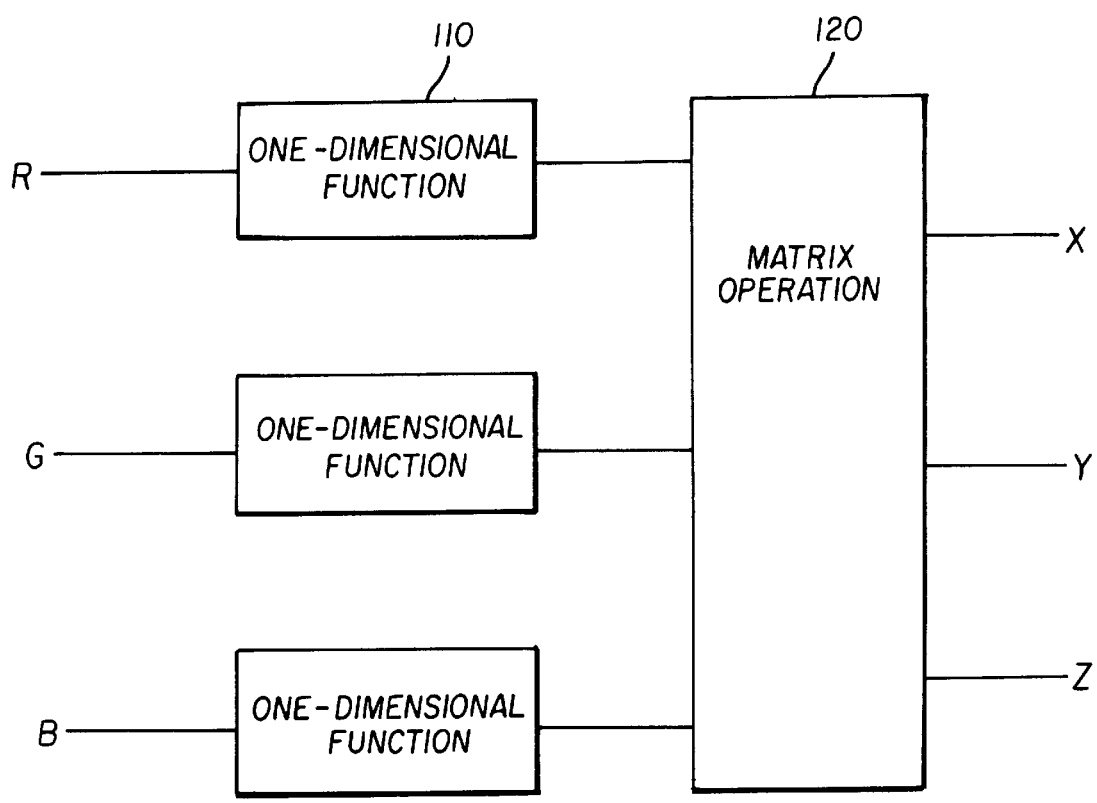
FIG. 4 shows the components of a typical camera response function.

The next step is to determine colorimetric values for each of the test patches in the captured test images (S104). This is generally done by first extracting digital camera code values from the captured test images. Typically, average digital camera code values are determined by averaging the pixels in the captured test images corresponding to each of the test patches. To avoid edge effects, the pixels near the edges of the test patches are usually not included in the averaging process. The location of the test patches may be determined using an automatic algorithm within a software program, or the user may be instructed to identify the coordinates of the patches using an input device such as a keyboard or a mouse. The digital camera code values will generally consist of a triplet of red-green-blue (RGB) code values, but in some cases other arrangements might be used that would produce other color combinations such as cyan-magenta-yellow (CMY) or cyan-magenta-yellow-green (CMYG). The code values will generally be non-linearly related to scene exposures. For purposes of illustration, it will be assumed that the digital camera produces RGB code values, but the methods described can easily be generalized to work with other color combinations as well. Once the digital camera code values have been extracted for each of the test patches in the digital image, a known response function for the digital camera is then used to determine the corresponding colorimetric values for each of the test patches. The known response function of the digital camera may be a standard one which was predetermined for a certain model of digital camera, or it may be a custom response function that was measured in the factory, or determined using a characterization procedure for the individual digital camera that was used to capture the images. With reference to FIG. 4, in many cases, the known response function for the digital camera can be adequately specified by a set of one-dimensional functions 110, followed by a matrix operation 120. The one-dimensional functions are used to transform the non-linear digital camera RGB code values into corresponding linear RGB signals. The matrix operation 120 is then used to transform the linear RGB signals into colorimetric XYZ tristimulus values which correspond to the colorimetry of the test patches produced on the output device. In some cases, improved accuracy can be obtained using more complex forms to describe the digital camera response function, such as multi-dimensional polynomial functions, or three-dimensional look-up tables (3-D LUTs).

Referring back to FIG. 3, the final step is to determine the response function of the output device (S106) using the colorimetric values determined in step S104. Depending on the type of output device being characterized, the response function of the output device may take on many different forms. If the output device is a video display, a simple response function including a set of non-linear one-dimensional functions followed by a color-correction matrix can typically be used to adequately describe the device response. In other cases, such as a printer, more complex forms for the device response function are generally required. The process of determining the response function of the output device may involve using the determined colorimetric values together with the known code values of the test patches to perform a mathematical regression procedure. In other cases, it may be appropriate to use other techniques to determine the output device response function from the colorimetric values. For example, interpolative techniques can be used to populate a multi-dimensional look-up table.

Once the device response for the output device has been determined, there are a number of ways in which the device response can be used. For example, it could be used to derive a device calibration function to correct the response of the output device to make it match some standard device response. Alternatively, it could be used to determine a device profile that could be used in a color management system to transform the color values in an image such that they have the desired color appearance when produced on the output device.

An example will now be given of a preferred embodiment of the present invention where a digital camera is used to characterize the device response of a video display.

Figure 5:
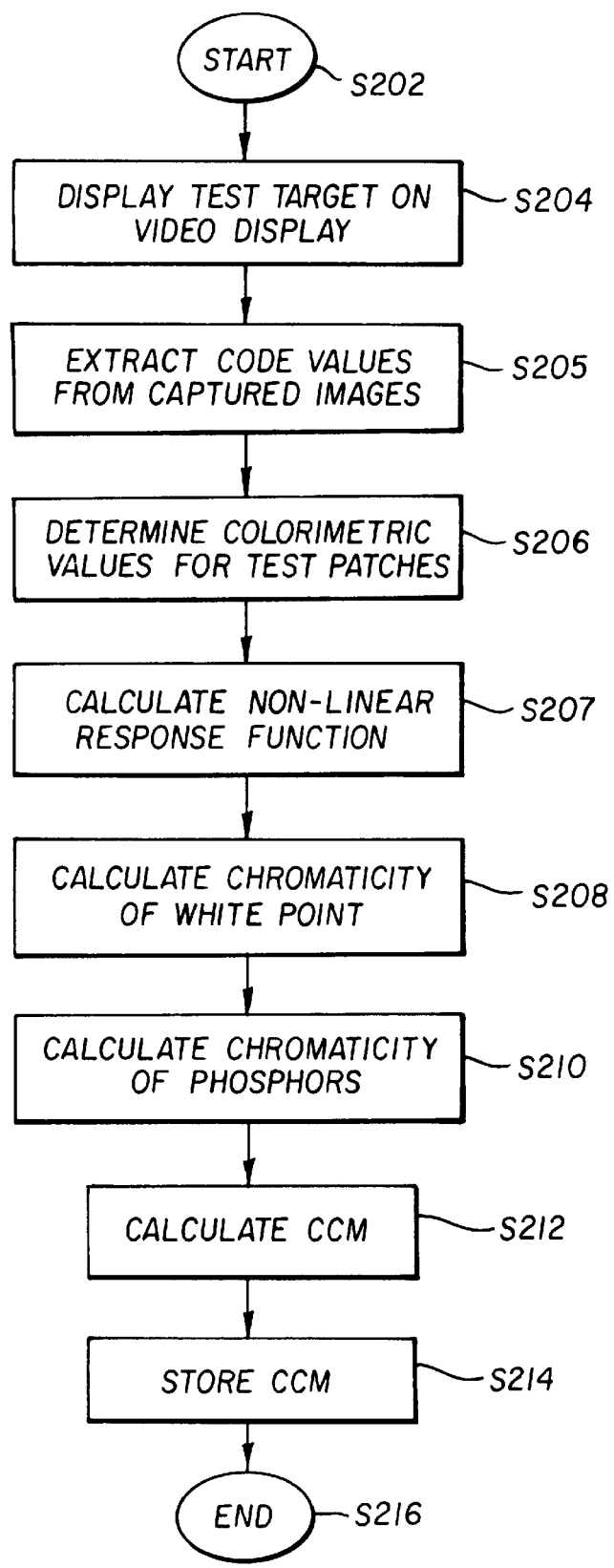
FIG. 5 is a flowchart of a software program useful for characterizing the response function of a video display according to the method of a preferred embodiment of the present invention.

Referring now to FIG. 5, there is illustrated a flowchart of a software program for a preferred embodiment of the present invention. A color chart having a plurality of different-colored patches with known pixel values is input to the microprocessor-based unit 20 by any well known means, such as by using a PC card. The software is initiated S202, and the digital representation is then retrieved by the software program and displayed on the video display 30 (S204). A series of one or more images are then captured by a digital camera, such as a "KODAK" DC120 and the like. The captured digital camera images are then downloaded to the microprocessor-based unit 20 for further processing.

The software next processes the captured test images to extract digital camera code values for the test patches in the captured test images (S205). As discussed above, this step will generally involve averaging the digital camera code values for the pixels which comprise each of the test patches. Once the digital camera code values are determined, the next step is to determine the corresponding colorimetric values for each of the test patches (S206). This is accomplished using a known response function for the digital camera, as previously discussed. A response function for the video display can now be determined which will relate the known pixel values for the test patches to the corresponding colorimetric values representing the color produced by the video display.

For a video display, a response function comprising a non-linear one-dimensional function followed by a color-correction matrix is generally adequate to describe the device response. This response function is functionally equivalent to the form of the camera device response function shown in FIG. 4. The nonlinear one-dimensional functions can often be described by a relatively simple model with between one and four parameters. The most important of these parameters is a "gamma" value which relates to the contrast of the video display. An example of a typical functional form for the non-linearity is given in the equation:

$$I = \left(\frac{CV_{input}}{255}\right)^{\gamma} \qquad (1)$$

where $CV_{input}$ is the input code value, I is the resulting linear image intensity, and $\gamma$ is the gamma value. This non-linear function has the effect of converting the RGB device code values into linear RGB signals. To determine the gamma value, a regression approach is generally applied to a series of neutral test patches in the test images. The known device code values for the test patches are used for the input code values, and the corresponding colorimetric values are used for the linear image intensity values. In some cases, more complex models of the device non-linearity may be needed to accurately represent the device response. These models might include additional parameters to represent offsets, and black levels, etc. For the present example, it will be assumed that the simple one-parameter non-linear model will be used. This step is shown as (S207) on FIG. 5.

Continuing with the discussion of FIG. 5, once the non-linear one-dimensional function has been determined, it is then necessary to compute the color-correction matrix for the video display which relates the linear RGB signals to the corresponding colorimetric XYZ tristimulus values. This matrix can be determined using a regression approach based on the measured colorimetric values for a set of colored test patches. Alternatively, it can be computed directly from the colorimetric values for a white patch, together with colorimetric values for the red, green, and blue patches. For purposes of illustration, this second method will be described with reference to the preferred embodiment. The two steps involved with the second method are shown in FIG. 5 as the calculate chromaticity of white point step (S208), and the calculate chromaticity of the red, green and blue phosphors step (S210).

The fundamental characteristic of the white point which is needed to determine the color correction matrix is its chromaticity, where the chromaticity can be determined from the XYZ tristimulus values using the equations:

$$x = \frac{X}{X+Y+Z} \qquad (2a)$$

$$y = \frac{Y}{X+Y+Z} \qquad (2b)$$

The chromaticity values can be determined directly from the determined colorimetric values for a white patch (255, 255, 255) in the test image. Alternatively, the chromaticity for a series of neutral patches can be computed and averaged since the chromaticity of gray patches should be independent of intensity. In some cases, it may be more accurate to calculate the chromaticity of the white point indirectly, rather than directly from the colorimetric values of the neutral patches. For example, the white point of a video display will generally vary according to its color temperature. If the measured colorimetric values can be used to estimate the color temperature of the video display, the color temperature value can then be used to estimate the white point chromaticity using standard techniques (for example see: Wyszecki and Stiles, *Color Science: Concepts and Methods, Quantitative Data and Formulas*, Second Edition, (1982)).

Next the chromaticities of the phosphors must be determined using step S210. Typically, chromaticity values can be calculated directly from the measured colorimetric values for pure red (255, 0, 0), green (0, 255, 0) and blue (0, 0, 255) test patches in the test target using Eq. (2). In some cases, if the model of the video display is known, the phosphor chromaticity values may be known a priori. If the measurement error is found to be larger than the variability in the known phosphor chromaticities, then the known values can be used instead of the measured values.

From the white point chromaticity and the chromaticities of the red, green, and blue phosphors, a color correction matrix (CCM) can be calculated (S212) by techniques familiar to those skilled in the art. The device response function, comprising the gamma value and the color correction matrix can then be stored (S214) and used for purposes of calibrating the video display or for color correcting incoming images. The program can then be exited S216.

The invention has been described with reference to a preferred embodiment. However, it will be appreciated that variations and modifications can be effected by a person of ordinary skill in the art without departing from the scope of the invention.

What is claimed is:

1. A method for characterizing a response function of an output device, the method comprising the steps of:
   (a) producing a test image on the output device with a set of one or more test patches having known code values;
   (b) obtaining one or more captured images of the test image using a digital camera;
   (c) determining colorimetric values for the test patches in the captured images using a known response function of the digital camera, wherein the known response function of the digital camera relates code values of the captured image to corresponding colorimetric values of the test image;
   (d) determining a response function of the output device which relates the known code values to the determined colorimetric values throughout the entire range of colors of the output device.

2. The method as in claim 1 further comprising using either a video display or a printer as the output device.

3. The method as in claim 2 further comprising using any combination of an estimate of device non-linearity, white point, or colorant color to determine the response function of the output device.

4. The method as in claim 3 further comprising using a plurality of gray patches as the test patches when an estimate of device non-linearity is included in the response function of the output device.

5. The method as in claim 3 further comprising using a white patch as the test patch when the white point is included in the response function of the output device.

6. The method as in claim 3 further comprising using pure red, green and blue test patches when the colorant color is included in the response function of the output device.

7. The method of claim 1 wherein the step of determining the response function of the output device includes providing a one-dimensional non-linear function, and a color correction matrix.

8. The method of claim 1 wherein the step of determining the response function of the output device includes providing a three-dimensional look-up table.

9. The method of claim 1 wherein the step of determining the response function of the output device includes providing a multi-dimensional polynomial function.

10. The method of claim 1 wherein the step of determining the colorimetric values includes averaging test patch values from multiple images.

11. The method of claim 1 wherein the step of determining the response function of the output device includes combining the determined colorimetric values with known a priori output device characteristics.

12. The method of claim 11 wherein the known a priori output device characteristics include the colorimetric values of the output device colorants.

13. The method of claim 1 wherein steps (c) and (d) are performed using a microprocessor based unit inside the digital camera.

14. The method of claim 1 wherein steps (c) and (d) are performed using a microprocessor based unit inside the output device.

15. The method of claim 1, further including the step of determining a calibration function for the output device from the determined response function of the output device.

16. The method of claim 15 wherein the calibration function is used to correct the output device to make it substantially match a standard device response.

17. The method of claim 1, further including the step of modifying an image to be displayed on the output device according to the determined response function of the output device.

18. The method of claim 1, further including the step of determining a device profile for the output device from the determined response function of the output device, wherein the device profile is intended for use in for a color management system.

19. A computer program product for characterizing a response function of an output device, comprising a computer readable storage medium having a computer program stored thereon for performing the steps of:
   (a) producing a test image on the output device with a set of one or more test patches having known code values;
   (b) obtaining one or more captured images of the test image using a digital camera;
   (c) determining colorimetric values for the test patches in the captured images using a known response function of the digital camera, wherein the known response function of the digital camera relates code values of the captured image to corresponding colorimetric values of the test image;
   (d) determining a response function of the output device which relates the known code values to the determined colorimetric values throughout the entire range of colors of the output device.

20. The computer program product as in claim 19 further comprising the step of using either a video display or a printer as the output device.

21. The computer program product as in claim 20 further comprising the step of using any combination of an estimate of device non-linearity, white point, or colorant color to determine the response function of the output device.

22. The computer program product as in claim 21 further comprising the step of using a plurality of gray patches as the test patches when an estimate of device non-linearity is included in the response function of the output device.

23. The computer program product as in claim 21 further comprising the step of using a white patch as the test patch when the white point is included in the response function of the output device.

24. The computer program product as in claim 21 further comprising the step of using pure red, green and blue test patches when the colorant color is included in the response function of the output device.

25. The computer program product of claim 19, wherein the step of determining the response function of the output device includes providing a one-dimensional non-linear function, and a color correction matrix.

26. The computer program product of claim 19, wherein the step of determining the response function of the output device includes providing a three-dimensional look-up table.

27. The computer program product of claim 19, wherein the step of determining the response function of the output device includes providing a multi-dimensional polynomial function.

28. The computer program product of claim 19, wherein the step of determining the colorimetric values includes averaging test patch values from multiple images.

29. The computer program product of claim 19, wherein the step of determining the response function of the output device includes combining the determined colorimetric values with known a priori output device characteristics.

30. The computer program product of claim 29, wherein the known a priori output device characteristics include the colorimetric values of the output device colorants.

31. The computer program product of claim 19, wherein steps (c) and (d) are performed using a microprocessor based unit inside the digital camera.

32. The computer program product of claim 19, wherein steps (c) and (d) are performed using a microprocessor based unit inside the output device.

33. The computer program product of claim 19, further including the step of determining a calibration function for the output device from the determined response function of the output device.

34. The computer program product of claim 33 wherein the calibration function is used to correct the output device to make it substantially match a standard device response.

35. The computer program product of claim 19, further including the step of modifying an image to be displayed on the output device according to the determined response function of the output device.

36. The computer program product of claim 19, further including the step of determining a device profile for the output device from the determined response function of the output device, wherein the device profile is intended for use in for a color management system.

37. A system for characterizing a response function of an output device, the system comprising:
(a) means for producing a test image on the output device with a set of one or more test patches having known code values;
(b) means for obtaining one or more captured images of the test image using a digital camera;
(c) means for determining colorimetric values for the test patches in the captured images using a known response function of the digital camera, wherein the known response function of the digital camera relates code values of the captured image to corresponding colorimetric values of the test image;
(d) means for determining a response function of the output device which relates the known code values to the determined colorimetric values throughout the entire range of colors of the output device.

38. The system as in claim 37 further comprising either a video display or a printer as the output device.

39. The system as in claim 38 further comprising means for using any combination of an estimate of device non-linearity, white point, or colorant color to determine the response function of the output device.

40. The system as in claim 39 further comprising means for using a plurality of gray patches as the test patches when an estimate of device non-linearity is included in the response function of the output device.

41. The system as in claim 39 further comprising means for using a white patch as the test patch when the white point is included in the response function of the output device.

42. The system as in claim 39 further comprising means for using pure red, green and blue test patches when the colorant color is included in the response function of the output device.

43. The system as in claim 37, wherein the means for determining the response function of the output device includes providing a one-dimensional non-linear function, and a color correction matrix.

44. The system of claim 37, wherein the means for determining the response function of the output device includes providing a three-dimensional look-up table.

45. The system of claim 37, wherein the means for determining the response function of the output device includes providing a multi-dimensional polynomial function.

46. The system of claim 37, wherein the means for determining the colorimetric values includes averaging test patch values from multiple images.

47. The system of claim 37, wherein the means for determining the response function of the output device includes combining the determined colorimetric values with known a priori output device characteristics.

48. The system of claim 37, wherein the known a priori output device characteristics include the colorimetric values of the output device colorants.

49. The system of claim 37, wherein means for performing elements (c) and (d) are performed using a microprocessor based unit inside the digital camera.

50. The system of claim 37, wherein means for performing elements (c) and (d) are performed using a microprocessor based unit inside the output device.

51. The system of claim 37, further including means for determining a calibration function for the output device from the determined response function of the output device.

52. The system of claim 51 wherein the calibration function is used to correct the output device to make it substantially match a standard device response.

53. The system of claim 37, further including means for modifying an image to be displayed on the output device according to the determined response function of the output device.

54. The system of claim 37, further including means for determining a device profile for the output device from the determined response function of the output device, wherein the device profile is intended for use in for a color management system.

55. The method as claimed in claim 1 wherein said known response function of the digital camera comprises a set of one-dimensional functions that transform the code values of the captured image into corresponding linear RGB signals, and a matrix operation that is used to transform the linear RGB signals into colormetric XYZ tristimulus values of the test image.

56. The method as claimed in claim 1 wherein said known response function of the digital camera comprises a three dimensional lookup table which relates code values of the captured image to corresponding colorimetric values of the test image.

57. The method as claimed in claim 1 wherein said known response function of the digital camera comprises a multi-dimensional polynomial function which relates code values of the captured image to corresponding colorimetric values of the test image.

58. The computer program product as claimed in claim 19 wherein said known response function of the digital camera comprises a set of one-dimensional functions that transform the code values of the captured image into corresponding linear RGB signals, and a matrix operation that is used to transform the linear RGB signals into colormetric XYZ tristimulus values of the test image.

59. The computer program product as claimed in claim 19 wherein said known response function of the digital camera comprises a three dimensional lookup table which relates code values of the captured image to corresponding colorimetric values of the test image.

60. The computer program product as claimed in claim 19 wherein said known response function of the digital camera comprises a multi-dimensional polynomial function which relates code values of the captured image to corresponding colorimetric values of the test image.

61. The system as claimed in claim 37 wherein said known response function of the digital camera comprises a set of one-dimensional functions that transform the code values of the captured image into corresponding linear RGB signals, and a matrix operation that is used to transform the linear RGB signals into colormetric XYZ tristimulus values of the test image.

62. The system as claimed in claim 37 wherein said known response function of the digital camera comprises a three dimensional lookup table which relates code values of the captured image to corresponding colorimetric values of the test image.

63. The system as claimed in claim 37 wherein said known response function of the digital camera comprises a multi-dimensional polynomial function which relates code values of the captured image to corresponding colorimetric values of the test image.

* * * * *

UNITED STATES PATENT AND TRADEMARK OFFICE
CERTIFICATE OF CORRECTION

PATENT NO. : 6,130,756
DATED : October 10, 2000
INVENTOR(S) : Barbara L. Grady, et al It is certified that error appears in the above-identified patent and that said Letters Patent is hereby corrected as shown below:

On the title page:

| | |
|---|---|
| Inventor field, face of patent | -- Barbara L. Grady, Rochester, N.Y.; Kevin E. Spaulding, Spencerport, N.Y. -- |
| Assignee field, face of patent | -- Eastman Kodak Company, Rochester, N.Y. -- |

Signed and Sealed this

Twenty-fourth Day of April, 2001

Attest:

NICHOLAS P. GODICI

Attesting Officer

Acting Director of the United States Patent and Trademark Office

UNITED STATES PATENT AND TRADEMARK OFFICE
CERTIFICATE OF CORRECTION

| | | |
|---|---|---|
| PATENT NO. | : 6,130,756 | Page 1 of 1 |
| APPLICATION NO. | : 09/041206 | |
| DATED | : October 10, 2000 | |
| INVENTOR(S) | : Grady et al. | |

It is certified that error appears in the above-identified patent and that said Letters Patent is hereby corrected as shown below:

ON THE TITLE PAGE, ITEM (54) AND IN THE SPECIFICATION, COLUMN 1, LINE 2

In the title after the word OUTPUT insert the word -- DEVICE --

Signed and Sealed this
Eighth Day of April, 2014

Michelle K. Lee
*Deputy Director of the United States Patent and Trademark Office*